United States Patent [19]

Willems

[11] 3,982,945

[45] Sept. 28, 1976

[54] DEVELOPMENT OF SILVER HALIDE EMULSIONS

[75] Inventor: Jozef Frans Willems, Wilrijk, Belgium

[73] Assignee: AGFA-GEVAERT, N.V., Mortsel, Belgium

[22] Filed: Mar. 24, 1975

[21] Appl. No.: 561,659

[30] Foreign Application Priority Data

Apr. 3, 1974 United Kingdom.............. 14802/74

[52] U.S. Cl................................... 96/66 R; 96/66.3

[51] Int. Cl.².......................................... G03G 5/30

[58] Field of Search............... 96/66 R, 66 HD, 66.3

[56] References Cited

UNITED STATES PATENTS 3,567,441 3/1971 Vogt.................................. 96/66 R

OTHER PUBLICATIONS

Chiba Daigaka Kobabubu Kentyu Hokoku, vol. 19, No. 35, pp. 77–84, Mar. 1968, by Mizusawa.

James, Photographic Science and Engineering, vol. 4, No. 5, Sept.–Oct. 1960, pp. 271–280.

*Primary Examiner*—Mary F. Kelley
*Attorney, Agent, or Firm*—A. W. Breiner

[57] ABSTRACT

Development of exposed photographic silver halide emulsion is described wherein development occurs by means of an organometallic complex of a metal capable of changing its valency and an aliphatic aminocarboxylic acid containing at least one mono- or di(carboxyalkyl)aminoalkyl group and at least one hydroxyl group, or a water-soluble salt of the chelating compounds.

14 Claims, 1 Drawing Figure

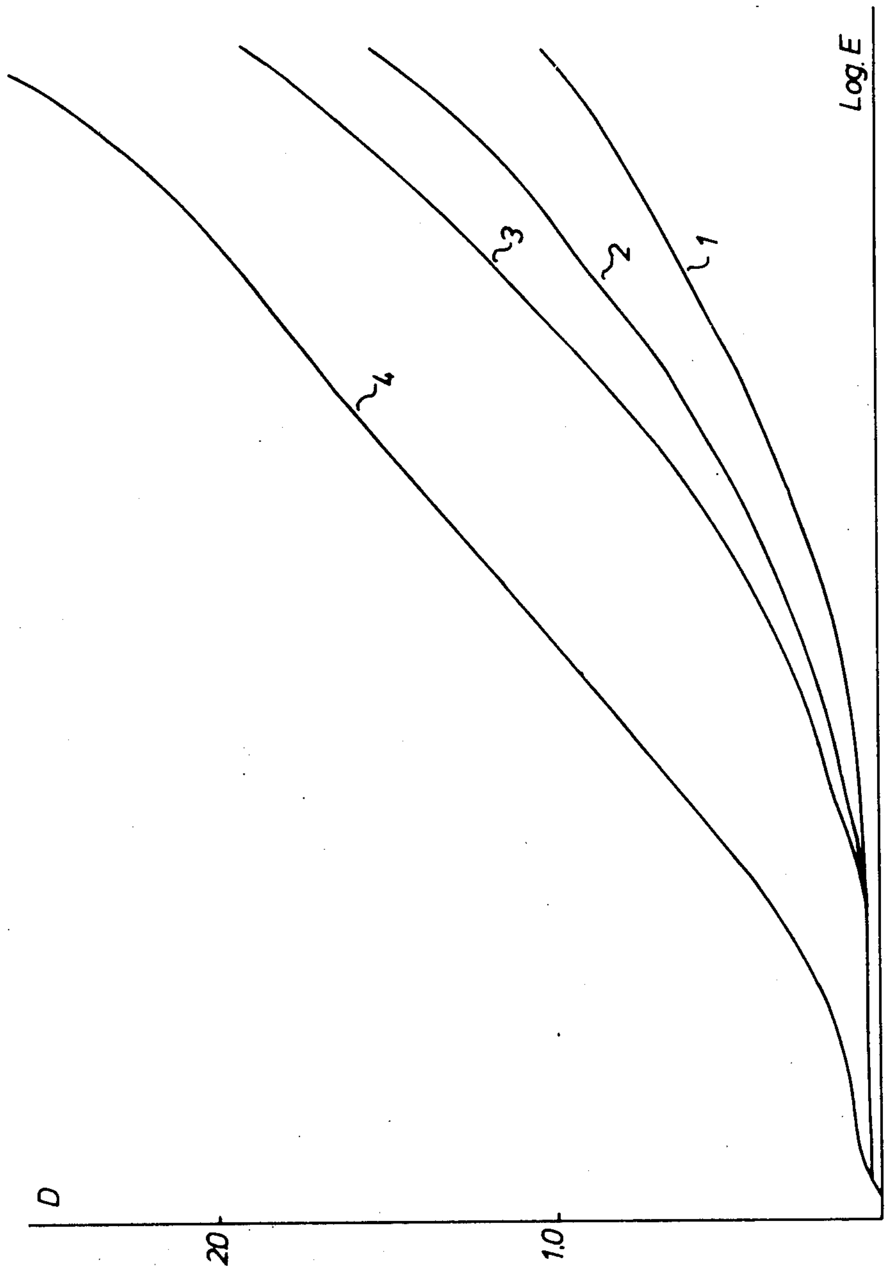
D
20
1.0
Log.E
1
2
3
4

DEVELOPMENT OF SILVER HALIDE EMULSIONS

The present invention relates to photography and more particularly to novel developers for photographic silver halide elements.

In the usual method for developing exposed silver halide emulsions, highly alkaline processing solutions comprising one or more organic developing agents e.g. dihydroxybenzenes such as hydroquinone, 1-phenyl-3-pyrazolidinone and its derivatives, p-aminophenols e.g. N-monomethyl-p-aminophenol sulphate, ascorbic acid, etc. are normally employed.

However, organic complexes of metals capable of changing their valency are also known to act as photographic developers. For example, in French Pat. No. 1,068,805 iron(II) and titanium (III) complexes of aminopolycarboxylic acids of the aliphatic type including water-soluble salts thereof, in which the amino group(s) comprise(s) at most one hydrogen atom directly linked to the nitrogen atom, e.g. iron(II) and titanium(III) complexes of ethylene diamine tetraacetic acid (EDTA), methylene diamine tetraacetic acid, nitrilo-triacetic acid, and diethylenetriamino diacetic acid have been described as developing agents.

According to T. H. James, Phot.Sci. & Eng., Vol. 4, No. 5, 1960, p. 271–280 these organometallic complexes, more particularly the complex formed by the iron (II) ion and the EDTA ion, can be satisfactorily used to develop several types of silver halide emulsions and can be used over a wide range of pH-values.

As compared with the common organic developers the organometallic complexes have several advantages e.g. they are very easy to dissolve in water, they are active in a wide pH-range so that it is not necessary to have recourse to highly alkaline solutions and they form a completely reversible oxidation-reduction system so that the oxidation-reduction potential of the developing solution can be easily determined and controlled and so that the reducible forms can be easily regenerated from the oxidized forms by simple reduction. By the latter property, the use of such organometallic complexes as developing agents also contributes to avoid water-pollution. Whereas exhausted highly alkaline developing solutions comprising the common organic developing agents may strongly pollute surface waters, the exhausted organometallic developers can be recovered by electrolytic reduction.

Though the known complex organometallic developing agents can be satisfactorily used to develop several types of silver halide emulsions, their development activity remains rather low.

It has now been found that complexes of metals capable of changing their valency, especially iron(II)complexes, with aliphatic aminocarboxylic acids containing at least one mono- or di-(carboxyalkyl)aminoalkyl group and at least one hydroxyl group or with water-soluble salts of such aminocarboxylic sequestering compounds e.g. alkali metal salts such as ammonium, sodium, potassium and lithium have improved development activity for exposed silver halide emulsions as compared with the corresponding metal aminocarboxylic acid complexes containing no hydroxyl group.

The present invention therefore provides photographic developing compositions comprising a complex of a metal capable of changing its valency and an aliphatic aminocarboxylic acid containing at least one mono- or di-(carboxyalkyl)aminoalkyl group and at least one hydroxyl group or a water-soluble salt of the chelating compounds.

The present invention also provides a process for the production of photographic silver images by development of a photographic material having a layer containing developable silver halide wherein development occurs by means of such metal complex.

The developable silver halide may have been obtained not only by image-wise exposure but also by overall re-exposure or chemical fogging of a previously image-wise exposed, developed and bleached silver halide emulsion as e.g. in reversal processing or by overall exposure or chemical fogging as in direct-positive image formation.

Preferred sequestering compounds for forming with metal ions organometallic developing agents according to the present invention can be represented by the following general formula:

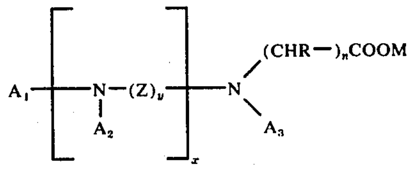

wherein:

M represents a cation, e.g. hydrogen, ammonium, organic ammonium, potassium, sodium and lithium, R represents hydrogen, alkyl including substituted alkyl, aryl including substituted aryl or aralkyl including substituted aralkyl, $n$ represents a positive integer, preferably 1 to 5, most preferably 1, $x$ represents 0 or provided $y$ is 1, may be a positive integer, preferably 1 to 3, and each of $A_1$, $A_2$ and $A_3$ (the same or different) represents hydrogen, or alkyl including substituted alkyl e.g. alkyl substituted by -N($A_1$)($A_2$), aryl e.g. phenyl, hydroxy, alkoxy, carboxy, sulpho, phosphono, etc.

Z represents an alkylene group or alkylene-phenylene-alkylene group in which the alkylene groups are preferably $C_1$-$C_5$ alkylene groups, and $y$ represents 0 or 1, the amino group(s) in the molecule comprising at most one hydrogen atom linked to the nitrogen atom and the molecule comprising at least one hydroxyl group in one or more of the groups $A_1$, $A_2$, $A_3$, R and Z.

The sequestering compounds used to form the complex organometallic developing agents of the invention are known in literature see e.g. British Patent 952,162, Bull.Soc.Chim. Belg. 67 (1958) 167 and Belg.Chem.Ind. T XXIII, no. 10 (1958) 1105–1116.

Representative examples of particularly suitable sequestering compounds are:

1.
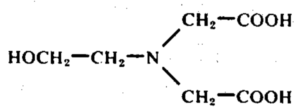
2.
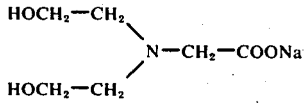
3.
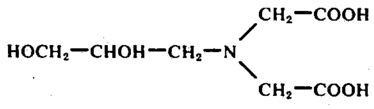
4.
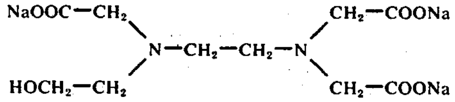
5.
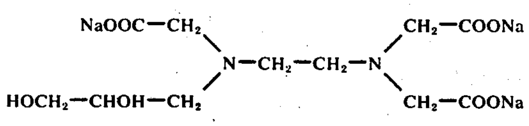
6.
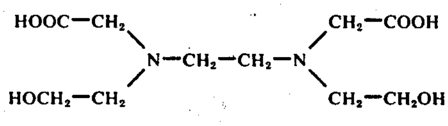
7.
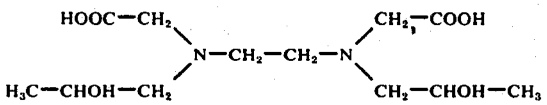
8.
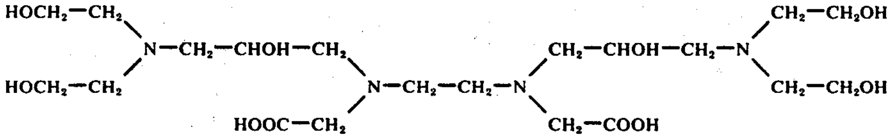
9.
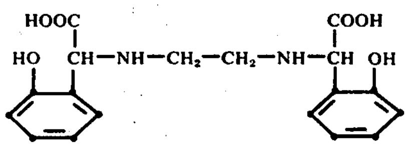
10.
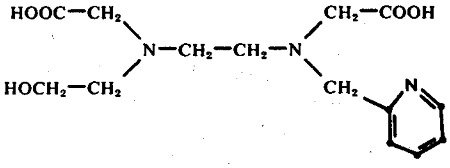
11.
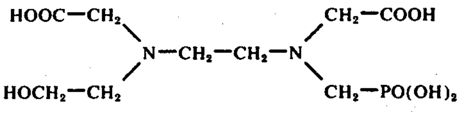
12.
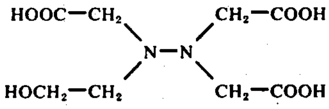
13.
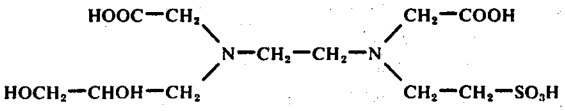

-continued

14. 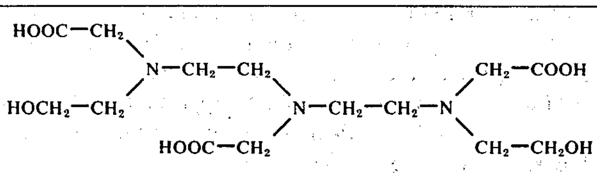

15. 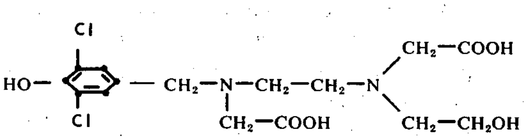

16. 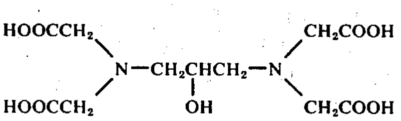

17. 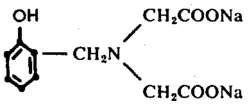

18. 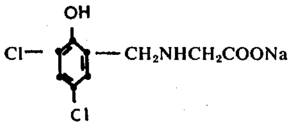

19. 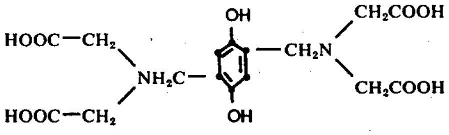

Although it is known on the one hand that metal amino carboxylic acid complexes containing no hydroxyl groups have development activity e.g. as described in French Pat. No. 1,068,805 referred to hereinbefore and on the other hand that aminocarboxylic acids bearing hydroxyl groups are sequestering agents for heavy metal ions, there was no reason at all to expect that improved development activity could be obtained with the metal complexes of the latter sequestering agents.

Preferred metal complexes for use according to the present invention are the iron(II) complexes formed by association of iron(II) ions with ions of the aminocarboxylic acid sequestering agents bearing hydroxyl groups e.g. by mixing aqueous solutions of iron(II) salts e.g. iron(II) sulphate with aqueous solution of the sequestering agents. The sequestering agent is preferably used in amounts at least equimolar with regard to the iron(II) salt. These amounts are preferably comprised between about 10 mmoles and about 300 mmoles per liter of developer.

The complex developers according to the present invention are reversible systems. Thus it is possible to recover the exhausted iron(II)-iron(III) complex developer by electrolytic reduction.

Owing to the reversible character, it is also possible to maintain the developing power permanently at the stage desired in each particular case by adjusting electrolytically the reduction potential to the desired constant value e.g. as described in British Pat. No. 510,259.

Developing solutions according to the present invention may comprise in addition to the organometallic complexes as defined hereinbefore, development restrainers e.g. potassium bromide, antifoggants, silver halide solvents, fixing agents, organic auxiliary developing agents for obtaining superadditive effects e.g. 1-phenyl-3-pyrazolidinone and its derivatives, p-aminophenol and p-phenylene diamine derivatives of the type described in U.S. Pat. Nos. 3,265,499 - 3,615,525 and 3,723,117 e.g. 1-ethyl-6-hydroxy-1,2,3,4-tetrahydroquinoline and 1-ethyl-6-diethylamino-1,2,3,4-tetrahydroquinoline, and bis(pyridone) azines of the type described in U.S. Pat. No. 3,749,575 e.g. bis(1-methyl-2-pyridone) azine dihydrochloride, developer preservatives e.g. sodium sulphite, bisulphites, development accelerating onium compounds especially ammonium compounds e.g. onium compounds of the type described in U.S. Pat. Nos. 3,682,634 and 3,713,827 e.g. 1,1'-tetramethylene-bis(pyridinium chloride) and 1,1'-ethylene-2,2'dipyridilium dibromide, polyoxyalkylene compounds as well as other ingredients known for use in developing compositions.

Since the sequestering agents are also calcium sequestering agents it is not necessary to include in the developer other Ca-sequestering agents as commonly done in organic developers e.g. sodium pyrophosphate, although this may be done in order not to interfere with the development activity.

Though the activity of the organometallic developers according to the present invention is relatively pH independent, it is preferred to use developers with pH comprised between about 6 and about 11.

As referred to hereinbefore the organometallic developers of the present invention can be formed by incorporating in the developing solution an iron(II) salt and a water-soluble sequestering agent as defined hereinbefore. However, it is also possible to incorporate the sequestering agent in the photographic element e.g. in the emulsion layer or in separate layers placed contiguous to the emulsion layer. In any method employed it is required of course that the sequestering agent be in chemical reactive relationship with the metal salt in the presence of water or a processing solution.

The silver halide materials suitable for development by means of the organometallic complexes according to the invention may comprise as light-sensitive silver halide: silver bromide, silver chloride or mixed silver halides e.g. silver chlorobromide, silver chlorobromoiodide, silver bromoiodide, and silver chloroiodide.

The emulsions can be chemically sensitized by any of the accepted procedures. The emulsions can be digested with naturally active gelatin or with sulphur containing compounds such as allyl isothiocyanate, allyl thiourea or sodium thiosulphate. The emulsions can also be digested in the presence of reducing agents e.g. the tin compounds described in Belgian Patents 493,464 and 568,687, the iminoamino methane sulphonic acid compounds described in United Kingdom Patent Specification 789,823, polyamines e.g diethylene triamine, spermine and bis($\beta$-aminoethyl)sulphide. They can further be digested in the presence of noble metal compounds such as ruthenium, rhodium, palladium, iridium, platinum and gold compounds as described by R. Koslowsky, Z. Wiss. Phot. 46, 65-72 (1951). Representative compounds are amonium chloropalladate, potassium chloroplatinate, sodium chloropalladite, potassium chloroaurite, potassium aurithiocyanate, potassium chloroaurate, gold(III)chloride, gold(I) sulphide, etc.

The emulsions can comprise emulsion-stabilizers and fog-inhibiting compounds e.g. the mercury compounds such as those described in Belgian Pat. Nos. 524,121 and 677,337 and in published Dutch Patent Application 67/15932, organic sulphur-containing compounds that form insoluble silver salts with silver ions, heterocyclic nitrogen-containing thioxo compounds or derivatives thereof, e.g. benzothiazoline-2-thione, 1-phenyl-2-tetrazoline-5-thione and 2-ethoxycarbonylthio-5-amino-thiadiazole, the compounds described in Belgian Patent Specifications 571,916 and 571,917, thiazolinium compounds of the type described in Product Licensing Index, December 1971 issue, p. 90–91, benzothiazolium compounds e.g. 2,3-dimethyl-5-methoxycarbonyl benzthiazolium p-toluene sulphonate and tetra- or penta-azaindenes especially those substituted by hydroxyl or amino groups e.g. those described by Birr, Z. Wiss. Phot. 47, 2–58 (1952). A very effective azaindene emulsion stabilizer is 5-methyl-7-hydroxy-s-triazolo[1,5-a]pyrimidine which can be used together with other emulsion stabilizers e.g. those of the type described above.

The emulsions may be X-ray and other non-spectrally sensitized emulsions as well as orthochromatic, panchromatic or infrared-sensitive emulsions; they may be of the type as used in the silver complex diffusion transfer process, etc. The emulsions may be spectrally sensitized by means of neutrocyanines, carboxycyanines, rhodacyanines, hemicyanines, merocyanines, oxonol dyes, styryl dyes and the like as described by F. M. Hamer in "The cyanine dyes and related compounds" (1954).

The emulsions may further comprise other compounds that sensitize the emulsion by development acceleration e.g. alkylene oxide polymers. These alkylene oxide polymers may be of various type e.g. polyethylene glycol having a molecular weight of 1500 or more, alkylene oxide condensation products or polymers as described in U.S. Pat. Nos. 1,970,578 - 2,240,472 - 2,423,549 - 2,441,389 - 2,531,832 and 2,533,990 and in United Kingdom Pat. Nos. 920,637 - 940,051 - 945,340 - 991,608 and 1,015,023. These development accelerating compounds may also be present in the silver halide developing solution. Other development accelerating compounds are onium and polyonium compounds preferably of the ammonium, phosphonium and sulphonium type.

Other addenda e.g. hardening agents such as formaldehyde, mucochloric and mucobromic acid, dialdehydes etc., wetting agents, plasticizers, matting agents, e.g. polymethylmethacrylate and silicon particles, light-screening dyes, etc. may be present in the silver halide emulsion or another layer of the light-sensitive silver halide materials developable according to the present invention.

The following examples illustrate the present invention.

Example 1

Strips of positive fine grain film-type 5.61 of Agfa-Gevaert N. V., Mortsel, Belgium were exposed through a grey filter with a light-quantity E which coresponds to the shoulder part of the density versus log E curve.

For comparison purposes each of the film strips was developed at 20°C in developing baths comprising per liter 40 mmole of Mohr salt (iron(II)amonium sulphate-6-water), 20 g of sodium sulphite, 0.5 g of potassium bromide and a sequestering agent as listed in table I hereinafter in the amount given.

The densities were determined after ½, 1, 3, 10 and 20 minutes development time.

Example 2

This example is analogous to example 1 with the only difference that the developer also comprises for some strips 1-phenyl-3-pyrazolidinone as listed in table II hereinafter.

Table I

| mmole sequestering agent | density (developer pH:8.7)after ½ min | 1 min | 3 min | 10 min | 20 min | density(developer pH:10.4)after ½ min | 1 min | 3 min | 10 min | 20 min |
|---|---|---|---|---|---|---|---|---|---|---|
| 80 mmoles of EDTA | 0.05 | 0.05 | 0.24 | 1.37 | 2.26 | 0.04 | 0.05 | 0.21 | 0.94 | 1.48 |
| 80 mmoles of nitrilo triacetic acid | 0.04 | 0.04 | 0.04 | 0.05 | 0.12 | 0.04 | 0.04 | 0.04 | 0.04 | 0.07 |
| 160 mmoles of nitrilo triacetic acid | 0.05 | 0.05 | 0.05 | 0.05 | 0.05 | 0.04 | 0.04 | 0.04 | 0.04 | 0.04 |
| 80 mmoles of diethylenetriamine pentaacetic acid | 0.04 | 0.04 | 0.05 | 0.36 | 1.24 | 0.04 | 0.04 | 0.06 | 0.39 | 0.90 |
| 80 mmoles of $(HOOCH_2C)_2N(CH_2CH_2O)_2CH_2CH_2N(CH_2COOH)_2$ | 0.04 | 0.04 | 0.04 | 0.04 | 0.05 | 0.04 | 0.04 | 0.04 | 0.04 | 0.09 |
| 160 mmoles of compound 2 | 0.04 | 0.07 | 0.68 | 1.71 | >3.00 | 0.28 | 0.64 | 1.21 | 2.10 | >3.00 |
| 80 mmoles of compound 4 | 0.04 | 0.11 | 0.69 | 1.74 | >3.00 | 0.09 | 0.31 | 0.95 | 1.81 | >3.00 |
| 80 mmoles of compound 17 | 0.38 | 0.68 | 1.31 | 2.66 | >3.00 | — | — | — | — | — |
| 160 mmoles of compound 17 | 0.29 | 0.66 | 1.60 | >3.00 | >3.00 | — | — | — | — | — |

Table II

| mmole sequestering agent | mmole 1-phenyl-3-pyrazolidinone | density (developer pH:8.7)after ½ min | 1 min | 3 min | 10 min | 20 min | density (developer pH:10.4) after ½ min | 1 min | 3 min | 10 min | 20 min |
|---|---|---|---|---|---|---|---|---|---|---|---|
| 80 mmoles of compound 4 | none | 0.04 | 0.11 | 0.69 | 1.74 | >3.00 | 0.09 | 0.31 | 0.95 | 1.81 | >3.00 |
| 80 mmoles of compound 4 | 0.31 mmole | 0.06 | 0.28 | 0.98 | 2.48 | >3.00 | 0.28 | 0.65 | 1.31 | 2.80 | >3.00 |
| 160 mmoles of compound 2 | none | 0.04 | 0.07 | 0.68 | 1.71 | >3.00 | — | — | — | — | — |
| 160 mmoles of compound 2 | 0.31 mmole | 0.05 | 0.31 | 1.08 | 2.58 | >3.00 | — | — | — | — | — |

Example 3

Strips of positive fine grain film type 5.61 of Agfa-Gevaert N. V., Mortsel, Belgium were exposed for 1/20 sec. through a continuous wedge with constant 0.15 in a sensitometer.

The exposed strips were developed at 20°C for 10 min. in developing baths (pH : 8.7) comprising per liter 40 mmoles of Mohr salt, 20 g of sodium sulphite, 0.5 g of potassium bromide and 80 mmoles of one of the following sequestering agents:

a. EDTA
b. compound 2
c. compound 4
d. compound 17

The density versus log exposure curves of the accompanying drawing wherein curves 1, 2, 3 and 4 are obtained with the developers comprising EDTA, compound 2, compound 4 and compound 17 respectively, clearly illustrate the superiority of the organo-iron(II) developers of the present invention over iron(II)-EDTA.

We claim:

1. Method of producing photographic silver images by development of a photographic element having a layer containing developable silver halide wherein the developer at the time of development includes an organometallic complex of a metal capable of changing its valency and an aliphatic aminocarboxylic acid, or a water-soluble salt thereof; said aliphatic aminocarboxylic acid corresponds to the formula:

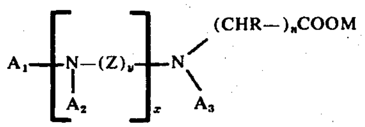

wherein:

M represents a cation,

R represents hydrogen, alkyl, substituted alkyl, aryl, substituted aryl, aralkyl or substituted aralkyl, $y$ is 0 or 1, $n$ is a positive integer, $x$ represents 0 or provided y is 1 may be a positive integer, each of $A_1$, $A_2$ and $A_3$ (the same or different) represents hydrogen, alkyl or substituted alkyl, and Z represents alkylene or alkylene-phenylene-alkylene, the amino group(s) in the molecule being secondary or teritiary amino groups and the molecule containing at least one hydroxyl group in one or more of $A_1$, $A_2$, $A_3$, R and Z.

2. Method according to claim 1, wherein the complex is an iron(II) complex.

3. Method according to claim 1, wherein besides the organometallic complex an organic auxiliary developing agent is used in the development.

4. Method according to claim 3, wherein the auxiliary developing agent is 1-phenyl-3-pyrazolidinone or a derivative thereof.

5. Method according to claim 1, wherein the developing composition also comprises a development accelerating onium compound.

6. Method according to claim 1, wherein development occurs at a pH comprised between about 6 and about 11.

7. A photographic developer comprising an organometallic complex of a metal capable of changing its valency and an aliphatic aminocarboxylic acid, or a water-soluble salt thereof; said aliphatic aminocarboxylic acid corresponds to the formula:

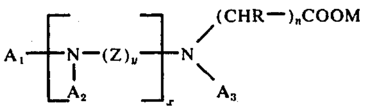

wherein:

M represents a cation,

R represents hydrogen, alkyl, substituted alkyl, aryl, substituted aryl, aralkyl or substituted aralkyl,

*y* is 0 or 1,

*n* is a positive integer,

*x* represents 0 or provided y is 1 may be a positive integer, each of $A_1$, $A_2$ and $A_3$ (the same or different) represents hydrogen, alkyl or substituted alkyl, and Z represents alkylene or alkylene-phenylene-alkylene, the amino group(s) in the molecule being secondary or teritary amino groups and the molecule containing at least one hydroxyl group in one or more of $A_1$, $A_2$, $A_3$, R and Z.

8. A photographic developer according to claim 7, wherein the complex is an iron(II) complex.

9. A photographic developer according to claim 7, which also comprises an organic auxiliary developing agent.

10. A photographic developer according to claim 9 wherein the auxiliary developing agent is 1-phenyl-3-pyrazolidinone or a derivative thereof.

11. A photographic developer according to claim 7, which also comprises a development accelerating onium compound.

12. A photographic developer according to claim 7, wherein the pH is comprised between about 6 and about 11.

13. A photographic developer according to claim 7, which comprises potassium bromide.

14. A photographic developer according to claim 7, which comprises sodium sulphite.

* * * * *